July 4, 1967    W. M. McCORD, JR    3,329,188
PROTECTOR FOR SAW BLADE
Filed Dec. 15, 1965
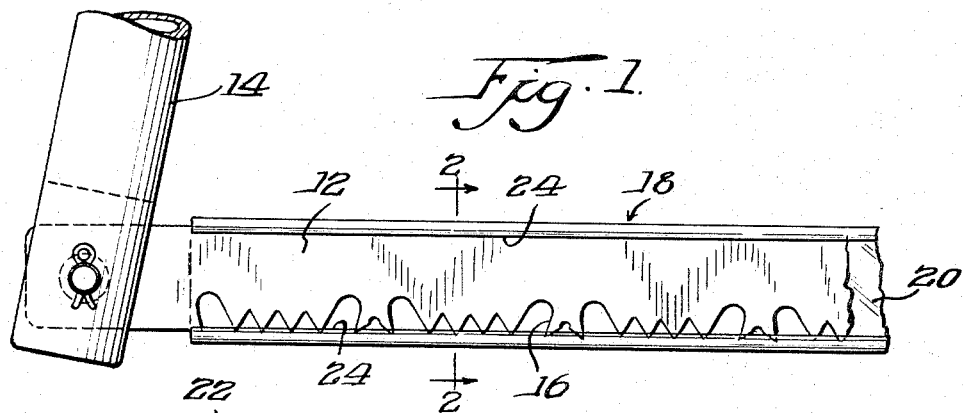
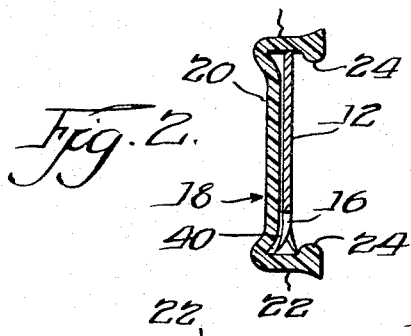
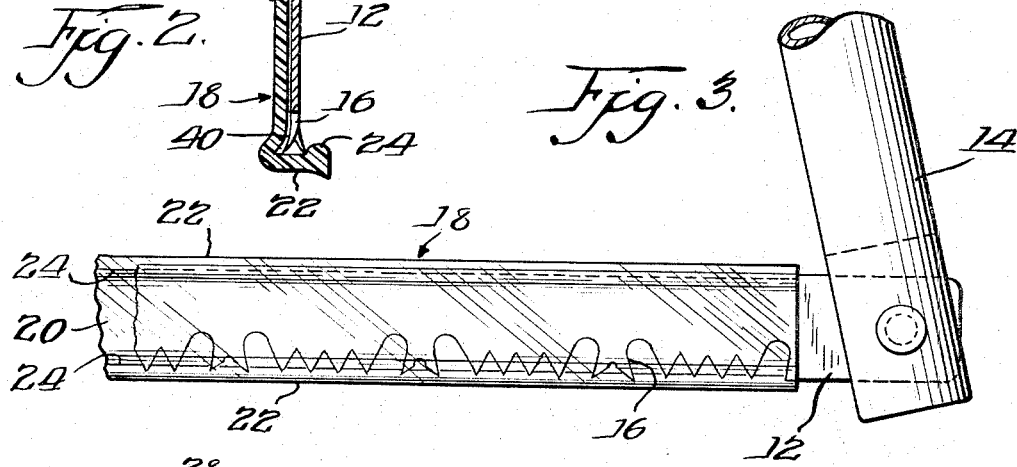
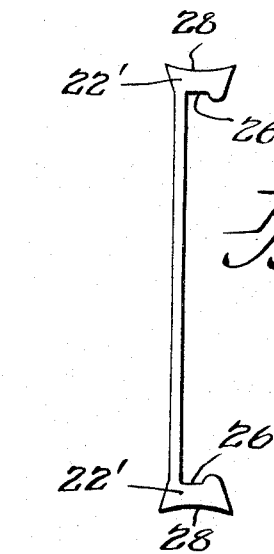
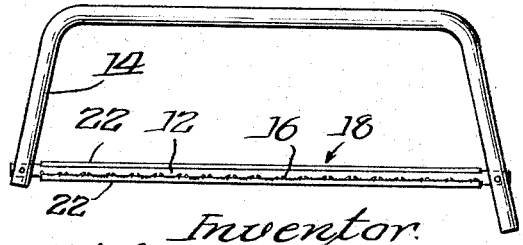
Inventor.
Wilfred M. McCord Jr.
By. Brown Jackson Boettcher + Diener
Attys.

United States Patent Office 3,329,188
Patented July 4, 1967

3,329,188
PROTECTOR FOR SAW BLADE
Wilfred M. McCord, Jr., Louisville, Ky., assignor to Vermont American Corporation, Louisville, Ky., a corporation of Kentucky
Filed Dec. 15, 1965, Ser. No. 514,020
7 Claims. (Cl. 145—35)

This invention relates to a protector for guarding the cutting edge of a blade and more particularly to a reusable saw blade protector for covering and guarding a saw blade having an array of cutting teeth formed along one edge thereof.

When providing a saw blade for the consumer market, the present common practice is to fold and staple a piece of cardboard over the blade. The sharp teeth of many of the blades packaged in this manner easily pierce the cardboard. Many times, the teeth remain exposed through the holes which have been pierced in this manner. It can be easily seen that no safety feature is present in such a method, but actually a suggestion of safety is presented by the cardboard cover. This is dangerous.

Further, it is also obvious that because of its construction, the cardboard cover is usually discarded after the assembly of the saw blade on a saw frame. From that time on, the sharp teeth of the saw are dangerously exposed. They are dangerous because in this condition they can accidentally harm humans and other objects and things which are relatively softer than the teeth of the blade. The exposed teeth are also subject to damage from materials which are relatively harder than the teeth of the blade. Such cardboard covers also present a selling problem, since a potential customer cannot readily see the blade without removing or tearing the cardboard cover.

Other blade covers are nonresilient and must be sheathed over the blade. For these covers to be practical, at least one end of the blade must be exposed. Consequently, if used to cover the blade of a conventional bow saw which has both its ends attached to the frame, the blade cannot be covered, except by first detaching the blade from its supporting frame.

Basically, the present invention is a snap-on cover designed to protect the cutting edge of a blade without occluding vision of the configuration of the blade. The cover may be made from a resilient material which is softer than the cutting portion of the blade to be protected. Construction from such material permits the repetitive use of the protector. The resilience of the cover allows it to be snapped over a saw blade without damaging the cutting teeth thereof. In place, the cover extends substantially along the toothed portion of the blade, covering both edges and one side of the blade. Beads are provided on the protector to prevent it from slipping off the blade after being snapped in place. The beads extend inwardly a minimal distance to maintain visibility of blade configuration from the open side of the protector. The material of the protector is at least translucent to provide visibility of the blade configuration from the closed side of the protector.

It thus is an object of the present invention to provide a protector for a saw blade which prevents injury to individuals during the shipment, storage and sale of the blades.

An additional object of the present invention is to provide a permanent and reusable cover for the blade.

Another object of the present invention is to provide a cover plainly showing the configuration of the teeth of the saw blade to a potential user of the blade without removing or tearing the protector.

A further object of the present invention is to provide a cover for a saw blade which may be snapped on the blade without damage to the cutting teeth.

Other objects and advantages of the invention will be shown in the following detailed description of a preferred embodiment thereof, as illustrated in the accompanying drawing in which:

FIG. 1 is a fragmentary elevational view illustrating a protector formed according to the present invention, snapped over the cutting edge of the blade which is mounted on a saw frame;

FIG. 2 is a sectional view taken along the line 2—2 of FIG. 1;

FIG. 3 is a fragmentary elevational view of a protector snapped over the blade connected to a saw frame with the configuration of the teeth showing clearly through the protector;

FIG. 4 is an enlarged elevational view of another embodiment of my invention; and FIG. 5 is an elevational view of a protector snapped over the blade connected at both ends to a saw frame.

Referring now to the drawings, a conventional saw blade 12 is shown suitably mounted at both its ends (FIG. 5) to a saw frame 14. The saw blade 12 (FIG. 1) is formed having an array of cutting teeth 16 formed along one edge of the blade.

A reusable saw blade protector 18 formed according to the present invention is shown snapped over the blade for guarding the cutting edge thereof. The protector 18 comprises an elongated body formed to a channel-shaped cross-section (FIG. 2), substantially equal in length to the toothed portion of the blade. In a preferred embodiment, the protector is formed or extruded of a substantially transparent or at least translucent material which is resilient but tough, such as plastic. Examples of suitable material include polystyrene, polyethylene, polyvinyl and polypropylene. The material chosen for the protector should be relatively softer than the cutting tip of the teeth so that the sharpness of the teeth is not dulled nor the cutting points damaged by the protector. The preferred material is high impact styrene or polypropylene.

The protector 18 includes a resilient connecting web 20 and a pair of flanges 22 extending outwardly from the edges of the web in a substantially common direction. The flanges 22 extend along the longitudinal edges of the web. A bead 24 is integrally formed on the flanges 22. The bead 24 extends inwardly from the flanges 22 adjacent the longitudinal periphery thereof. The flanges may be relatively thick as compared to the web. The connecting web is thinner to facilitate the bending of the protector along a longitudinal plane of symmetry through the protector.

The protector is assembled to a saw blade by snapping it over the blade in a manner so as to hold the blade without rattling. For this purpose, the flanges 22 overlie and frictionally engage the back edge and the cutting edge of the blade. The free end of the flanges may turn inwardly, a slight way toward each other to improve their engagement and grip on said edges. The web transversely overlies one side of the blade. In this way, the cutting edge of the blade is protected from damage without occluding the vision of the configuration of the teeth when viewed from either side of the protector, and the protector is held snugly about the blade and does not rattle.

One of the flanges need not extend along the entire length of the protector but portions of the flange may be a spaced-apart relationship, so long as sufficient flange area remains to frictionally engage the blade and prevent the protector from accidentally dislodging from the blade. However, in a preferred embodiment of the protector 18 the flanges 22 extend longitudinally along both edges of the body. This has the advantage that either flange may be used to engage the cutting edge of the blade.

The bead 24 may be formed along only one of the flanges for snapping over either the back edge or the toothed edge of the blade and preventing the protector from slipping off the blade once the protector is snapped in place. In a preferred embodiment, the beads 24 extend inwardly longitudinally along the respective flanges.

The beads 24 extend inwardly a minimal distance from the flanges for maintaining the visibility of the blade from the open side of the protector after snapping the protector over the blade. The beads define troughs 26 in flanges 22′, best seen in FIG. 4, into which the back edge or the cutting edge of the blade may rest. Because the material of the body is at least translucent, when an assembled blade is viewed from the web or closed side of the protector, the configuration of the toothed edge of the blade may still be seen. The resilient, tough material of the protector provides a reusable safe body which may be snapped over or frictionally engage a saw blade without damaging the cutting points of the toothed edge of the blade. The protector may be snapped over a saw blade which has both ends attached to the saw frame without disassembling the blade from the frame. A positive manual act on the part of a user is required to remove the protector from the blade, and accidental dislodgement is prevented. If the beads and troughs extend longitudinally along the entire length of both flanges, the protector is symmetrical about a longitudinal axis therethrough. An added feature is thus provided in that a user simply inserts the blade into the open side of the channel with the cutting edge positioned in either trough.

To aid the manual assembly and disassembly of the protector and the blade, a depression 28 may be formed longitudinally along the outer surface of the flanges 22′. The user's fingers may grip in said depressions to slightly flex the web and easily snap the protector on or off the blade. Further, the depressions enhance the springiness of the flanges and facilitate the snapping of the flanges over the edges of the blade.

An internal groove 40 (FIG. 2) may be formed internally of the protector along the length of the flange 22 where they connect to the web 20. These grooves 40 provide clearance for the set of the teeth positioned within the cover and also provide pivot points around which the flanges may rotate when they are snapped over the two edges of the saw blade.

Thus, the present invention provides a snap-on protector for protecting the cutting teeth of a saw blade without occluding vision of the teeth. The cover is made from a material which is softer than the saw teeth, thus protecting the cutting tips of the teeth. Since the material is rigid and tough, repetitive use of the protector is permitted and the flexibility afforded by the aforedescribed construction allows it to be snapped on the saw blade without damage to the cutting teeth even if the blade is mounted at both ends to a frame. In place, the protector extends along the entire toothed portion of the blade to prevent accidental damage or injury to things or persons coming in contact with the blade. Beads may be provided to prevent the protector from accidentally slipping off the blade after it is snapped in place.

While the fundamental novel features of the invention as applied to the embodiment and modifications have been shown, described and pointed out, it will be understood that various omissions and substitutions and changes in the forms and details of the device illustrated and in its operation may be made by those skilled in the art without departing from the spirit of the invention, and it is not intended that such forms and details be limitations upon the scope of the invention except insofar as set forth in the following claims.

I claim:
1. A protector for guarding the cutting edge of a saw blade comprising: a body to extend longitudinally of the cutting edge of the blade and having a channel-shaped cross-section of a resilient, tough material, said body including a web and flanges extending outwardly from the edges of the web; a longitudinal groove formed internally of said body along the length of at least one flange and web connection; said flanges disposed to overlie and frictionally engage the back edge and the cutting edge of the blade and the web disposed to overlie one side of the blade when assembled therewith; and means for preventing accidental removal of said protector from said blade whereby the cutting edge of the blade is protected from damage without occluding vision of the configuration of the blade.

2. A protector as defined in claim 1 wherein the flanges extend longitudinally along both edges of the body.

3. A protector as defined in claim 2 wherein said means includes at least one bead extending inwardly from at least one of the flanges for snapping over the blade to aid in preventing the protector from slipping off the blade when the protector is snapped in place.

4. A protector as defined in claim 1 wherein the same is constructed of a translucent material which permits viewing of the enclosed blade from either side.

5. A reusable saw blade protector for covering and guarding a saw blade having an array of cutting teeth formed along one edge thereof comprising: an elongate body formed to a channel-shaped cross-section of a length approximating the toothed portion of the blade, said body being of a substantially transparent, resilient, but tough plastic material, and including a relatively thin connecting web and a pair of thicker flanges extending outwardly from the longitudinal edges of the web in a common direction, a longitudinal groove formed internally of said body along the length of at least one flange and web connection, said flanges being so spaced apart and disposed as to overlie and frictionally engage the back edge and the toothed edge of the blade when assembled therewith, the connecting web when thus asembled overlying one side of the blade cooperating with the flanges to protect the tips of the cutting teeth without occluding vision of the teeth and their configuration from either side of the blade and means for preventing accidental removal of said protector from said blade.

6. A protector as defined in claim 5 wherein said means includes at least one bead extending inwardly from at least one of the flanges to prevent the protector from slipping off the blade when assembled therewith.

7. A protector as defined in claim 5 wherein said means includes a minimal bead extending inwardly of both flanges for snapping over the edges of the blade when assembled therewith for protecting the cutting teeth when the blade is not in use.

References Cited

UNITED STATES PATENTS

| | | | |
|---|---|---|---|
| 2,320,807 | 6/1943 | Upham | 30—90 |
| 2,636,264 | 4/1953 | Ganzer | 30—90 |
| 2,756,790 | 7/1956 | Syndbad | 145—35 |
| 3,177,582 | 4/1965 | Curtis | 30—90 |
| 3,178,815 | 4/1965 | Madrid | 30—90 |

FOREIGN PATENTS 633,605    7/1936    Germany.

WILLIAM FELDMAN, *Primary Examiner.*

R. V. PARKER, *Assistant Examiner.*